US008514425B2

(12) United States Patent
Furukawa et al.

(10) Patent No.: US 8,514,425 B2

(45) Date of Patent: Aug. 20, 2013

(54) IMAGE-FORMING SYSTEM, CRITERION-SETTING APPARATUS, AND STORAGE MEDIUM

(75) Inventors: Shigehiro Furukawa, Kanagawa (JP); Koki Uwatoko, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 49 days.

(21) Appl. No.: 13/240,672

(22) Filed: Sep. 22, 2011

(65) Prior Publication Data

US 2012/0176640 A1 Jul. 12, 2012

(30) Foreign Application Priority Data

Jan. 6, 2011 (JP) ................................ 2011-001425

(51) Int. Cl.
*G06F 15/00* (2006.01)
*G06K 1/00* (2006.01)

(52) U.S. Cl.
USPC ........................... 358/1.14; 358/1.1; 358/1.15

(58) Field of Classification Search
None
See application file for complete search history.

(56) References Cited

FOREIGN PATENT DOCUMENTS

| | | | |
|---|---|---|---|
| JP | 09-167009 | A | 6/1997 |
| JP | 09-230753 | A | 9/1997 |
| JP | 2006-007516 | A | 1/2006 |
| JP | 2007102506 | A | 4/2007 |
| JP | 2008-006757 | A | 1/2008 |

OTHER PUBLICATIONS

Australian Patent Examination Report No. 1, dated Jan. 7, 2013, issued in corresponding Australian Patent Application No. 2011250826.

*Primary Examiner* — Thierry Pham
(74) *Attorney, Agent, or Firm* — Sughrue Mion, PLLC

(57) ABSTRACT

An image-forming system includes a determining section that, for each type of malfunction in image-forming apparatuses, determines a reference number of occurrences of the type of malfunction based on at least one of (1) a distribution of the number of apparatuses in which the type of malfunction has occurred against the number of occurrences of the type of malfunction and (2) a distribution of the number of apparatuses on which maintenance has been carried out against the number of occurrences of the type of malfunction; an extracting section that extracts a subgroup of apparatuses in which the malfunction has occurred a number of times larger than or equal to the reference number of occurrences; and a setting section that sets a criterion for maintenance based on a time series tendency of occurrence of the malfunction in an apparatus on which maintenance has been carried out in the subgroup.

7 Claims, 17 Drawing Sheets

IMAGE-FORMING SYSTEM, CRITERION-SETTING APPARATUS, AND STORAGE MEDIUM

CROSS-REFERENCE TO RELATED APPLICATIONS

This application is based on and claims priority under 35 USC 119 from Japanese Patent Application No. 2011-001425 filed Jan. 6, 2011.

BACKGROUND (i) Technical Field

The present invention relates to image-forming systems, criterion-setting apparatuses, and storage media.

(ii) Related Art

Frequent malfunctions (such as paper jams and poor transfer) that affect the operation of an image-forming apparatus having image-forming function of forming and outputting an image on a recording material such as paper makes the image-forming apparatus inconvenient for users. Accordingly, there is a need for quick maintenance of an image-forming apparatus in such a condition.

Various inventions have so far been proposed that relate to techniques for determining the need for maintenance of an apparatus such as an image-forming apparatus.

SUMMARY

According to an aspect of the invention, there is provided an image-forming system including a first determining section that, for each type of malfunction in a group of image-forming apparatuses, determines a reference number of occurrences of the type of malfunction based on at least one of (1) a distribution of the number of image-forming apparatuses in which the type of malfunction has occurred against the number of occurrences of the type of malfunction and (2) a distribution of the number of image-forming apparatuses on which maintenance has been carried out after the occurrence of the type of malfunction against the number of occurrences of the type of malfunction; an extracting section that, for the type of malfunction for which the reference number of occurrences has been determined by the first determining section, identifies and extracts from the group of image-forming apparatuses a subgroup of image-forming apparatuses in which the malfunction has occurred a number of times larger than or equal to the reference number of occurrences; a setting section that generates a time series tendency of occurrence of the malfunction in an image-forming apparatus on which maintenance has been carried out in the subgroup extracted by the extracting section and that sets the tendency of occurrence of the malfunction as a criterion for maintenance for the type of malfunction if the tendency of occurrence of the malfunction satisfies a predetermined setting condition; and a second determining section that, for the type of malfunction for which the tendency of occurrence has been set by the setting section, compares a recent time series tendency of occurrence of the malfunction in a target image-forming apparatus with the tendency of occurrence of the malfunction set by the setting section to determine need for maintenance of the target image-forming apparatus on the basis of a degree of correlation between the tendencies of occurrence.

BRIEF DESCRIPTION OF THE DRAWINGS

Exemplary embodiment(s) of the present invention will be described in detail based on the following figures, wherein.

DETAILED DESCRIPTION

Exemplary embodiments of the present invention will now be described with reference to the drawings.

Figure 1:
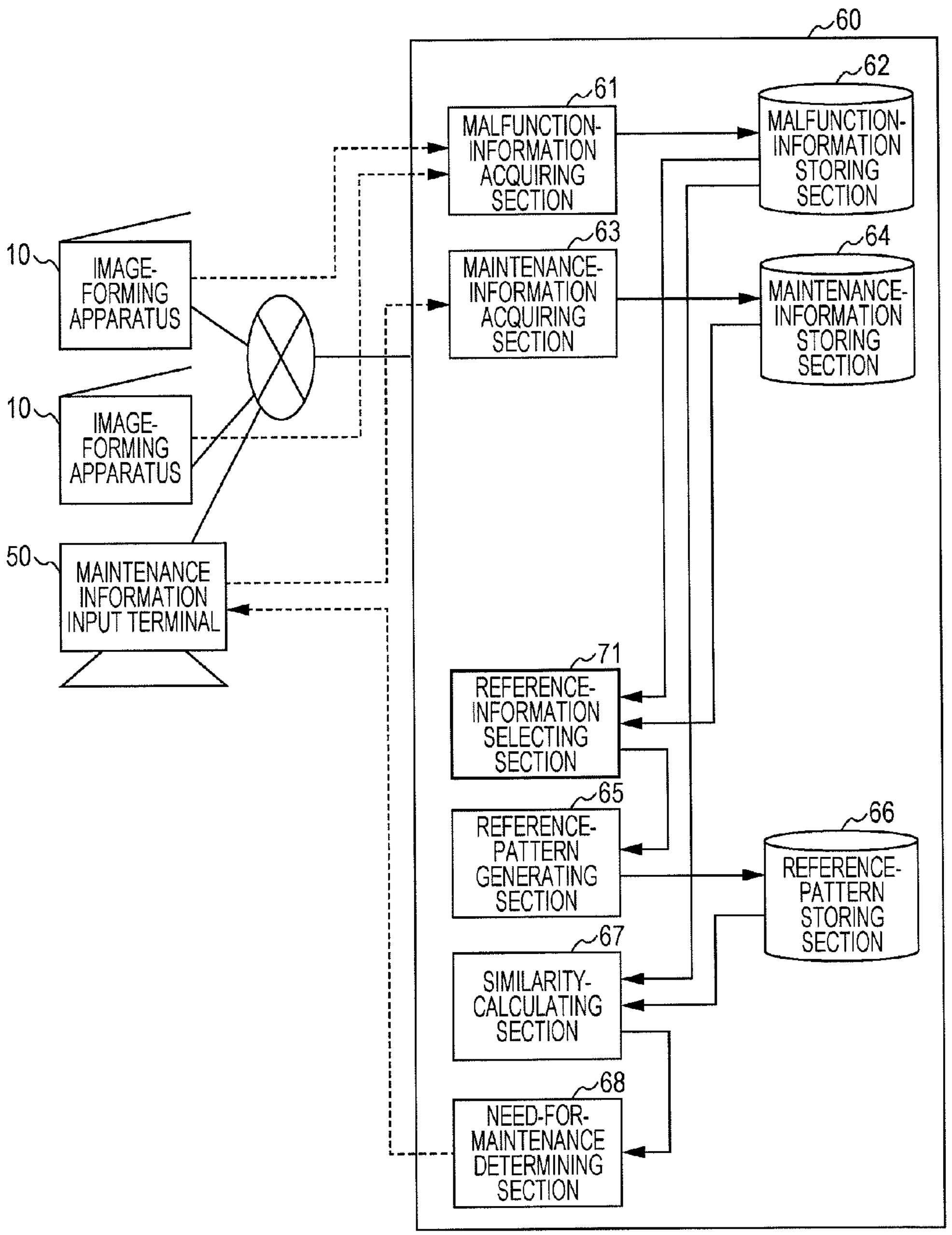
FIG. 1 is a diagram illustrating an image-forming system according to a first exemplary embodiment of the invention.

FIG. 1 illustrates an image-forming system according to a first exemplary embodiment of the invention.

The image-forming system according to this exemplary embodiment includes image-forming apparatuses 10 that form and output an image on a recording material such as paper and a maintenance information input terminal 50 used by, for example, an administrator or maintenance person of the image-forming apparatuses 10. Although two image-forming apparatuses 10 and one maintenance information input terminal 50 are shown in the example in FIG. 1, any number of image-forming apparatuses 10 and any number of maintenance information input terminals 50 may be provided.

In addition, the image-forming system according to this exemplary embodiment includes a monitoring apparatus 60 that is connected to the image-forming apparatuses 10 and the maintenance information input terminal 50 via a wired or wireless network such that they can communicate with each other and that determines the need for maintenance of the image-forming apparatuses 10 on the basis of information collected from the image-forming apparatuses 10 and the maintenance information input terminal 50. Although the monitoring apparatus 60 is configured as a single apparatus in the example in FIG. 1, the individual functions thereof may be distributed among different apparatuses.

The image-forming apparatuses 10 have image-forming function of forming and outputting an image on a recording material such as paper. Examples of the image-forming apparatuses 10 include printers (printing machines), copiers (copy machines), fax machines, and multifunction machines combining functions such as printing, copying, and faxing.

The operation of the image-forming apparatuses 10 will be briefly described with reference to FIG. 2.

Figure 2:
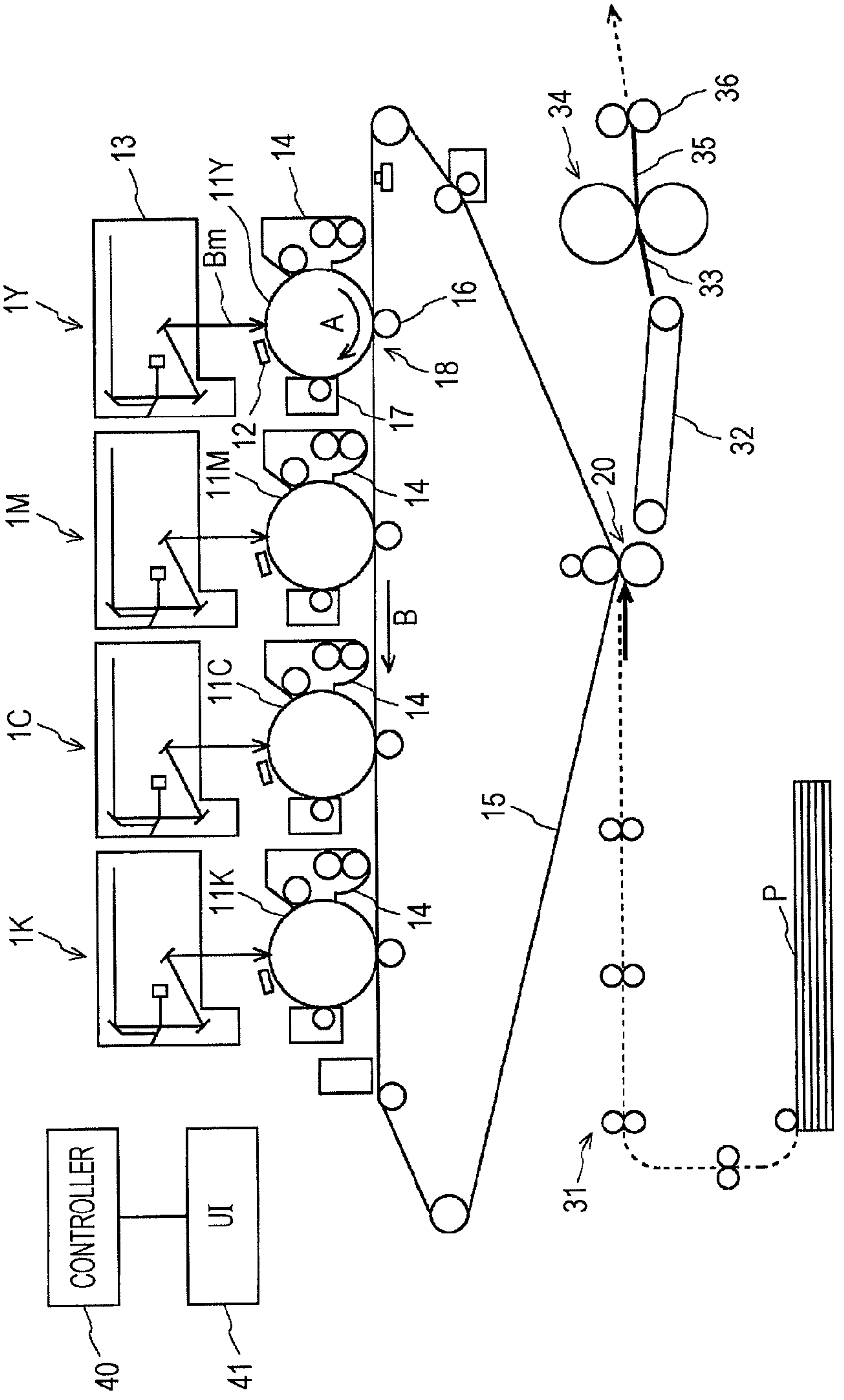
FIG. 2 is a diagram illustrating an example of the structure of an image-forming apparatus in the image-forming system according to the first exemplary embodiment.

FIG. 2 illustrates an example of the structure of an image-forming section in the image-forming apparatuses 10.

The image-forming apparatuses 10 according to this exemplary embodiment employ an intermediate transfer system commonly called a tandem system. The typical functional parts include image-forming units 1Y, 1M, 1C, and 1K that form toner images of different colors by electrophotography, a first transfer part 18 that sequentially transfers the toner images of different colors from the image-forming units 1Y, 1M, 1C, and 1K to an intermediate transfer belt 15 (first transfer), a second transfer part 20 that simultaneously transfers the superimposed toner images from the intermediate transfer belt 15 to a sheet of paper P (an example of a recording material) (second transfer), and a fixing device 34 that fixes the transferred image on the sheet of paper P.

In addition, the image-forming apparatuses 10 according to this exemplary embodiment include a controller 40 that controls the operation of each part and a user interface (UI) 41 that displays information for the user and accepts an instruction from the user.

In this exemplary embodiment, the image-forming units 1Y, 1M, 1C, and 1K include photoreceptor drums 11 (11Y, 11M, 11C, and 11K) that rotate in the arrow A direction. The photoreceptor drums 11 are each surrounded by various electrophotographic devices such as a charging device 12 that charges the photoreceptor drum 11, an exposure device 13 that writes an electrostatic latent image on the photoreceptor drum 11 by irradiation with an exposure beam Bm, a developing device 14 that contains a toner of the corresponding color and that develops the electrostatic latent image on the photoreceptor drum 11 with the toner, a first transfer roller 16 that transfers the toner image from the photoreceptor drum 11 to the intermediate transfer belt 15 in the first transfer part 18, and a drum cleaner 17 that removes residual toner from the photoreceptor drum 11.

The image-forming units 1Y, 1M, 1C, and 1K are arranged substantially linearly in the order of yellow (Y), magenta (M), cyan (C), and black (k) from the upstream side of the intermediate transfer belt 15 such that they can be put into and out of contact with the intermediate transfer belt 15.

In addition, the image-forming apparatuses 10 according to this exemplary embodiment have a paper transport system including a paper feed mechanism 31 that feeds a sheet of paper P from a sheet container to the second transfer part 20, a transport belt 32 that transports the sheet of paper P passing through the second transfer part 20 toward the fixing device 34, a fixing entrance guide 33 that guides the sheet of paper P to the entrance of the fixing device 34, a paper output guide 35 that guides the sheet of paper P output from the fixing device 34, and a paper output roller 36 that ejects the sheet of paper P guided by the paper output guide 35 to the outside of the image-forming apparatus 10.

That is, after the second transfer part 20 electrostatically transfers the toner image from the intermediate transfer belt 15 to the sheet of paper P fed from the sheet container to the second transfer part 20 by the paper feed mechanism 31, the sheet of paper P is transported to the transport belt 32 while being released from the intermediate transfer belt 15. The sheet of paper P is then transported to the fixing device 34 via the fixing entrance guide 33 by the transport belt 32 in accordance with the operational speed of the fixing device 34. The unfixed toner image on the sheet of paper P transported to the fixing device 34 is fixed on the sheet of paper P through fixing treatment with heat and pressure by the fixing device 114. Subsequently, the sheet of paper P having the image fixed thereon is transported to a paper output container (not shown) disposed outside the image-forming apparatus 10 via the paper output guide 35 and the paper output roller 36.

In addition, the image-forming apparatuses 10 according to this exemplary embodiment have the function of generating malfunction information by detecting various malfunctions occurring therein during image-forming operation. Examples of malfunction information include all types of error code information related to abnormal operation. The image-forming apparatuses 10 according to this exemplary embodiment detect predetermined malfunctions, including those belonging to levels such as errors, warnings, and information.

Various types of malfunction information are identified by error codes assigned thereto in advance. For example, the code "75-XXX" is assigned to malfunction information indicating that paper feeding from a manual feed section has failed, and the code "127-XXX" is assigned to malfunction information indicating that a chad container is almost full. In this exemplary embodiment, more than 400 types of codes are assigned to the image-forming section alone.

For example, if a visit (maintenance) is requested for the reason that no paper is ejected because of a jam at the fuser (fixing device 34), the malfunction that has actually occurred in the image-forming apparatuses 10 may be a failure of the fixing device 34 or running failure due to wear of a sheet feed roller on the input or output side of the fixing device 34. Thus, different types of malfunction information (error codes) may be generated from a single factor.

The malfunction information generated by the image-forming apparatuses 10 is transmitted to the monitoring apparatus 60 via wired or wireless communication. The malfunction information may be transmitted immediately after being generated, or may be stored in memories in the apparatuses 10 and be transmitted when a predetermined transmission criterion is satisfied. Specifically, for example, the malfunction information may be transmitted each time the operation mode of the apparatuses 10 is switched (for example, from normal mode to suspend mode), may be transmitted in response to a request from the monitoring apparatus 60, or may be transmitted every predetermined period of time (for example, every day).

In this exemplary embodiment, the malfunction information transmitted to the monitoring apparatus 60 contains, for example, the type of malfunction, the date and time of the malfunction, and apparatus ID information for identification of the image-forming apparatuses 10.

Next, the maintenance information input terminal 50 will be described.

In this exemplary embodiment, a maintenance person who has visited the site where the image-forming apparatuses 10 are installed and actually carried out maintenance work (or someone who has received a report about it) inputs maintenance information related to the maintenance work to the maintenance information input terminal 50, which then accepts the input and transmits it to the monitoring apparatus 60. In this exemplary embodiment, additionally, the maintenance information input terminal 50 receives information about the result of determination of the need for maintenance of the image-forming apparatus 10 from the monitoring apparatus 60 and displays it on a display provided on the image-forming apparatus 10.

In this exemplary embodiment, the maintenance information transmitted to the monitoring apparatus 60 contains, for example, the date and time of maintenance work, the type of malfunction removed by the maintenance work, and apparatus ID information for identification of the image-forming apparatus 10 subjected to the maintenance work. In this exemplary embodiment, the maintenance person inputs the type of malfunction removed by the maintenance work.

Next, the monitoring apparatus 60 will be described.

The monitoring apparatus 60 according to this exemplary embodiment determines the need for maintenance of the image-forming apparatuses 10. The monitoring apparatus 60 includes a malfunction-information acquiring section 61, a malfunction-information storing section 62, a maintenance-information acquiring section 63, a maintenance-information storing section 64, a reference-pattern generating section 65, a reference-pattern storing section 66, a similarity-calculating section 67, a need-for-maintenance determining section 68, and a reference-information selecting section 71.

The malfunction-information acquiring section 61 acquires (receives) malfunction information transmitted from any of the image-forming apparatuses 10 and stores it in the malfunction-information storing section 62.

The malfunction information stored in the malfunction-information storing section 62 contains, for example, the type of malfunction in the image-forming apparatus 10, the day and time of the malfunction, and apparatus ID information for identification of the image-forming apparatus 10.

The maintenance-information acquiring section 63 acquires (receives) maintenance information transmitted from the maintenance information input terminal 50 and stores it in the maintenance-information storing section 64.

The maintenance information stored in the maintenance-information storing section 64 contains, for example, the date and time of maintenance work, the type of malfunction removed by the maintenance work, and apparatus ID information for identification of the image-forming apparatus 10 subjected to the maintenance work.

Figure 3:
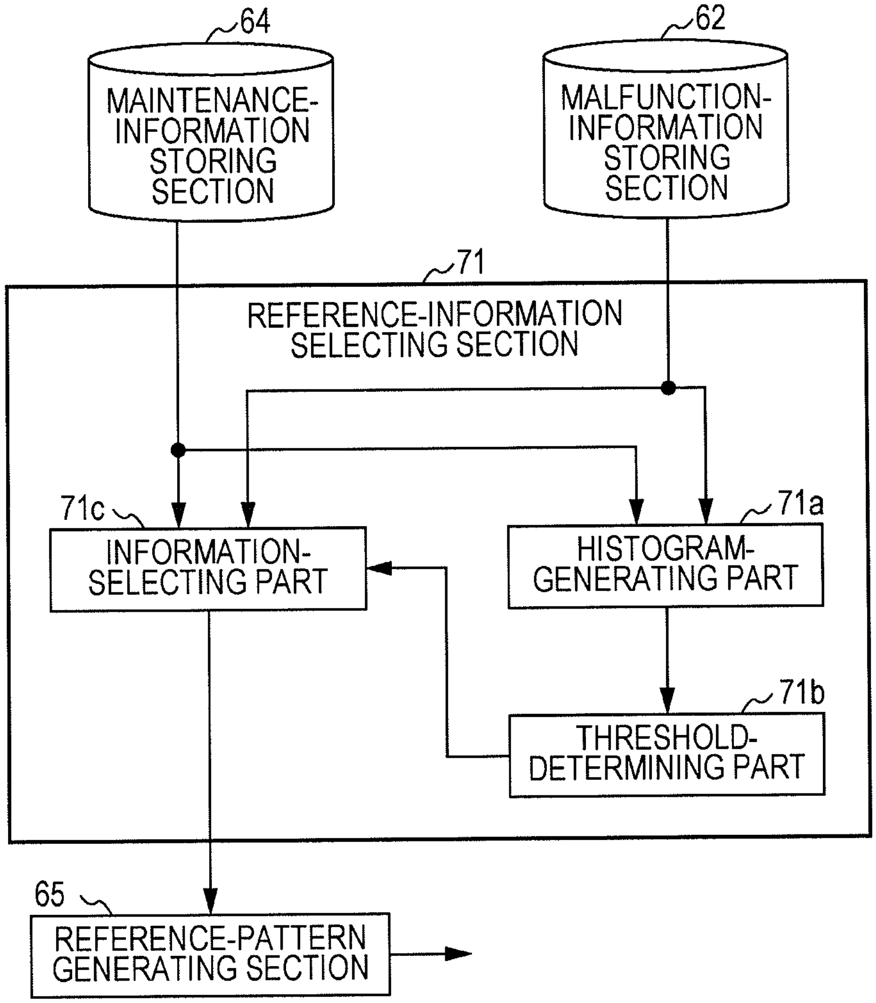
FIG. 3 is a diagram illustrating an example of the functional blocks of a reference-information selecting section in a monitoring apparatus according to the first exemplary embodiment.

The reference-information selecting section 71 selects (extracts) information used for generation of a reference pattern (an example of a criterion for maintenance) by the reference-pattern generating section 65. As illustrated by the functional blocks in FIG. 3, the reference-information selecting section 71 includes a histogram-generating part 71*a*, a threshold-determining part 71*b*, and an information-selecting part 71*c*.

For each type of malfunction, the histogram-generating part 71*a* generates (1) a histogram showing the distribution of the number of image-forming apparatuses 10 in which the malfunction has occurred against the number of occurrences of the malfunction in a period of time (hereinafter referred to as "overall histogram") and (2) a histogram showing the distribution of the number of image-forming apparatuses 10 on which maintenance work has been carried out after the occurrence of the malfunction against the number of occurrences of the malfunction in the period of time (hereinafter referred to as "maintenance case histogram").

Figure 4A:
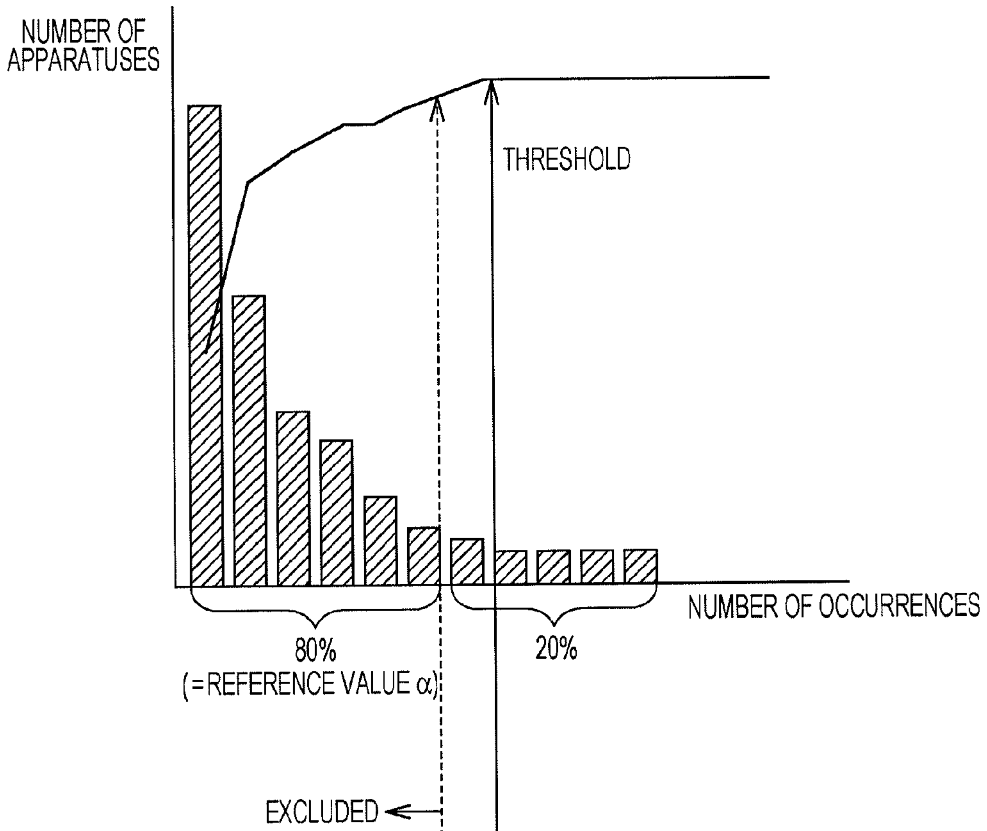
FIGS. 4A and 4B are graphs illustrating determination of a threshold in the first exemplary embodiment.
Figure 4B:
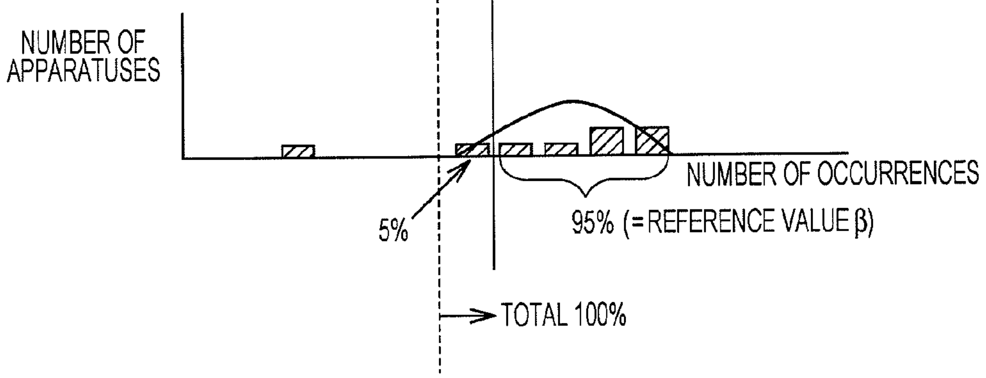

FIGS. 4A and 4B illustrate examples of histograms generated by the histogram-generating part 71*a* for each type of malfunction.

FIG. 4A shows an example of an overall histogram, where the horizontal axis indicates the number of occurrences of the malfunction, and the vertical axis indicates the number of image-forming apparatuses 10 in which the malfunction has occurred the corresponding number of times. The bar chart represents the number of image-forming apparatuses 10 in which the malfunction has occurred the corresponding number of times in a period of time for extraction of a pattern of occurrence (for example, five days), and the line chart represents the integral thereof.

FIG. 4B shows an example of a maintenance case histogram, where the horizontal axis indicates the number of occurrences of the malfunction, and the vertical axis indicates the number of image-forming apparatuses 10 in which the malfunction has occurred the corresponding number of times and on which maintenance work has been carried out. The bar chart represents the number of image-forming apparatuses 10 in which the malfunction has occurred the corresponding number of times and on which maintenance work has been carried out in a period of time for extraction of a pattern of occurrence (for example, five days), and the line chart represents the integral thereof.

On the basis of the overall histogram and the maintenance case histogram generated by the histogram-generating part 71*a*, the threshold-determining part 71*b* determines a threshold for determining information used for generation of a reference pattern for each type of malfunction. This threshold is used to extract a subgroup of image-forming apparatuses 10 characterizing the malfunction from the group of image-forming apparatuses 10 being managed by the system according to this exemplary embodiment. In this exemplary embodiment, the threshold (reference number) is set by determining the minimum number of occurrences of the malfunction at which the proportion of the cumulative number (integral) of image-forming apparatuses 10 in the total number of image-forming apparatuses 10 is higher than or equal to a reference value $\alpha$ (for example, 80%) in the overall histogram, and then determining the minimum number of occurrences of the malfunction in the upper distribution region where the proportion of the cumulative number (integral) of image-forming apparatuses 10 in the total number of image-forming apparatuses 10 is higher than or equal to a reference value $\beta$ (for example, 95%) in the maintenance case histogram.

The threshold may be determined using one of the overall histogram and the maintenance case histogram, rather than using both, as described above. Specifically, the overall histogram may be used alone to determine a threshold for extracting a subgroup of image-forming apparatuses 10 having a high frequency of the malfunction concerned, or the maintenance case histogram may be used alone to determine a threshold for extracting a subgroup of image-forming apparatuses 10 having a tendency to undergo maintenance after the occurrence of the malfunction concerned.

The information-selecting part 71*c* selects (extracts) information used for a reference pattern for each type of malfunction on the basis of the threshold determined by the threshold-determining part 71*b*. In this exemplary embodiment, the information-selecting part 71*c* extracts a subgroup of image-forming apparatuses 10 in which the malfunction has occurred a number of times larger than or equal to the threshold (for example, eight times) in a period of time for extraction of a pattern of occurrence (for example, five days), selects (extracts) malfunction information and maintenance information for each image-forming apparatus 10 belonging to that subgroup, and supplies the information to the reference-pattern generating section 65. That is, for the type of malfunction for which the threshold has been determined by the threshold-determining part 71*b*, the information-selecting part 71*c* calculates the number of occurrences of the malfunction in each image-forming apparatus 10 in the period of time on the basis of the information stored in the malfunction-information acquiring section 61 and identifies and extracts a subgroup of image-forming apparatuses 10 in which the malfunction has occurred a number of times larger than or equal to the threshold.

Figure 5:
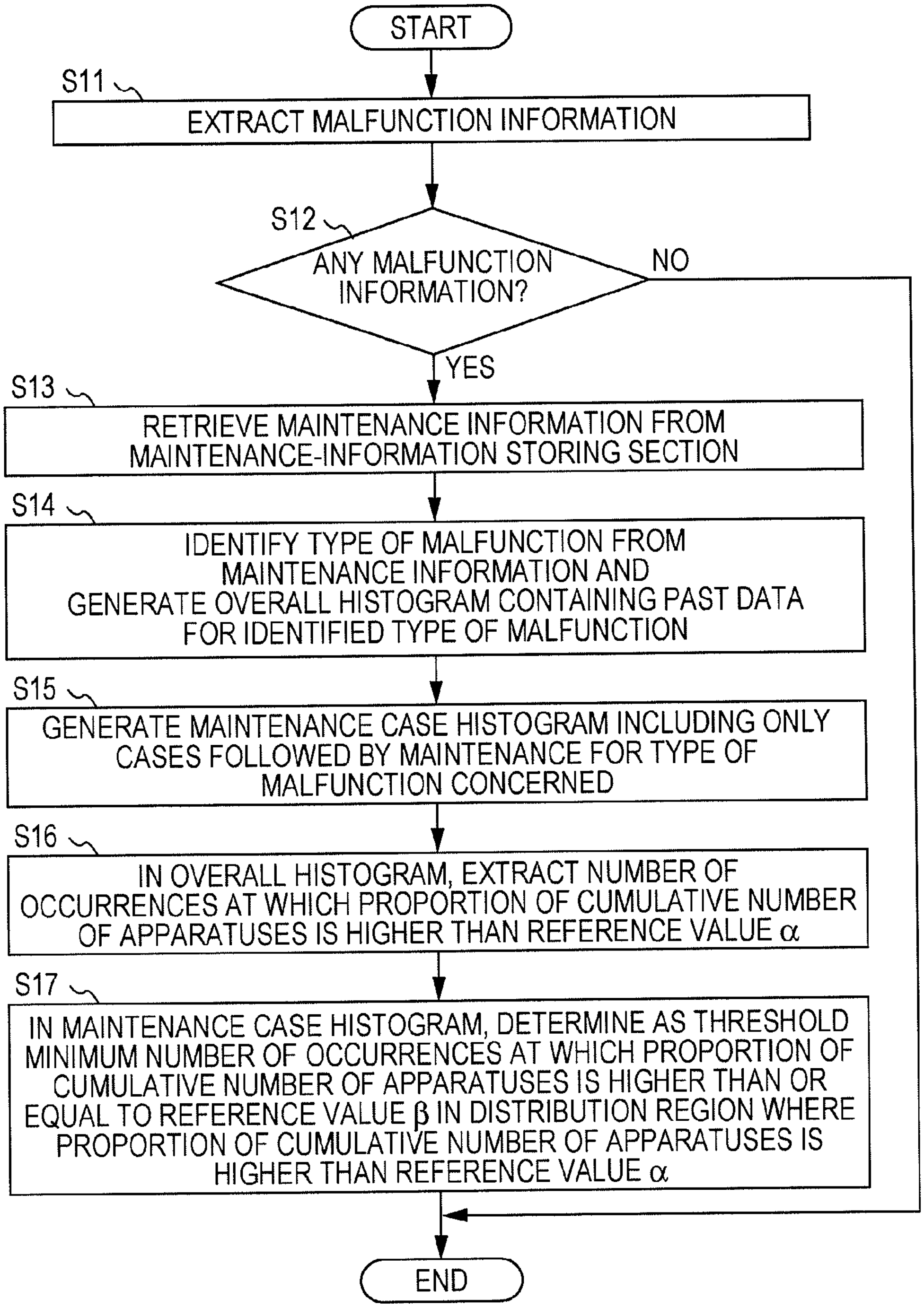
FIG. 5 is a flowchart illustrating an example of a process flow of determining a threshold in the first exemplary embodiment.
Figure 6:
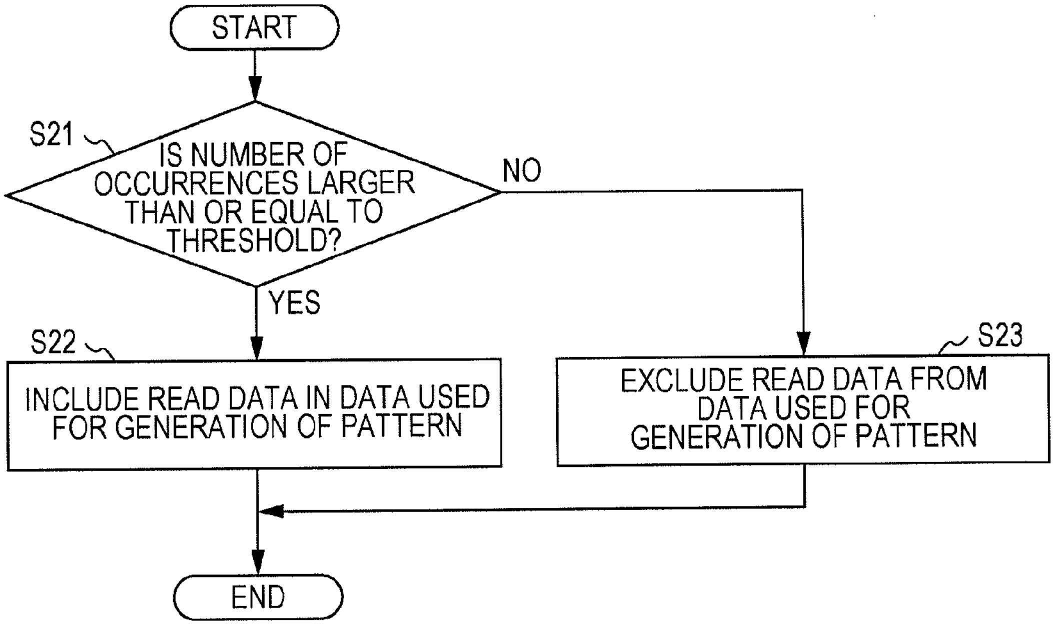
FIG. 6 is a flowchart illustrating an example of a process flow of selecting information in the first exemplary embodiment.

An example of the operation of the reference-information selecting section 71 according to this exemplary embodiment will now be described with reference to the process flow illustrated in FIGS. 5 and 6.

The reference-information selecting section 71 refers to the malfunction-information storing section 62 and executes the following process if there is any malfunction information (Steps S11 and S12).

First, the histogram-generating part 71*a* retrieves maintenance information from the maintenance-information storing section 64 (Step S13), identifies the type of malfunction associated with the maintenance work, retrieves malfunction information corresponding to the type of malfunction from the malfunction-information storing section 62, and generates an overall histogram and a maintenance case histogram for the type of malfunction concerned (Step S14 and S15).

Next, on the basis of the overall histogram, the threshold-determining part 71*b* determines the number of occurrences of the malfunction (for example, seven) at which the proportion of the cumulative number (integral) of image-forming apparatuses 10 is higher than the reference value a (Step S16), and on the basis of the maintenance case histogram, determines as the threshold (reference number) the minimum number of occurrences of the malfunction (for example, eight) in the upper distribution region where the proportion of the cumulative number (integral) of image-forming apparatuses 10 is higher than or equal to the reference value β in the distribution region where the proportion of the cumulative number (integral) of image-forming apparatuses 10 is higher than the reference value a (Step S17).

Next, the information-selecting part 71*c* calculates the number of occurrences of the malfunction in each image-forming apparatus 10 in a period of time (for example, five days) extending back with respect to the maintenance work, compares the number of occurrences with the determined threshold (Step S21), identifies and extracts a subgroup of image-forming apparatuses 10 in which the malfunction has occurred a number of times larger than or equal to the threshold, selects (extracts) malfunction information and maintenance information for each image-forming apparatus 10 belonging to that subgroup, and supplies the information to the reference-pattern generating section 65 (Step S22). On the other hand, malfunction information and maintenance information for the image-forming apparatuses 10 in which the malfunction has occurred a number of times smaller than the threshold are excluded from the information used for generation of a reference pattern (Step S23).

That is, cases where the number of occurrences of the malfunction is smaller than the threshold are regarded as being exceptional for that type of malfunction and are excluded from the information used for generation of a reference pattern for reduced load and improved determination accuracy in statistical processing for maintenance determination, described later.

On the basis of the malfunction information and the maintenance information extracted by the reference-information selecting section 71 from the maintenance information stored in the maintenance-information storing section 64 and the malfunction information stored in the malfunction-information storing section 62 (supplied from the reference-information selecting section 71), the reference-pattern generating section 65 extracts a time series tendency of occurrence of the malfunction detected in each image-forming apparatus 10 on which maintenance work has been carried out in the past, for example, in response to an emergency call, in a predetermined period of time before the maintenance work (hereinafter referred to as "pattern of occurrence"), generates a pattern of occurrence used as a criterion for maintenance (hereinafter referred to as "reference pattern") for the type of malfunction concerned, and stores the reference pattern in the reference-pattern storing section 66.

For example, the reference-pattern generating section 65 according to this exemplary embodiment generates the reference pattern for the type of malfunction concerned as follows.

First, on the basis of the malfunction information and the maintenance information extracted by the reference-information selecting section 71 from the maintenance information stored in the maintenance-information storing section 64 and the malfunction information stored in the malfunction-information storing section 62 (supplied from the reference-information selecting section 71), the reference-pattern generating section 65 retrieves pairs of the date and time of maintenance and apparatus ID information for the type of malfunction concerned, identifies associated malfunction information on the basis of each of the pairs of the date and time of maintenance and apparatus ID information retrieved for the type of malfunction concerned, and extracts a pattern of occurrence of the malfunction in the corresponding image-forming apparatus 10 in a period of time (for example, five days) extending back with respect to the maintenance work. Although the daily number of occurrences of the malfunction (or accumulated number of occurrences) in the period of time is extracted in this exemplary embodiment, the number of occurrences per unit time may be extracted by dividing the period of time into units of different time length (for example, one hour).

Next, for the type of malfunction concerned, the reference-pattern generating section 65 calculates the degrees of correlation (in this exemplary embodiment, correlation coefficients) between the extracted patterns of occurrence of the malfunction in the image-forming apparatuses 10 on which maintenance work has been carried out in the past, and divides (groups) the patterns of occurrence into groups of correlated patterns of occurrence having a degree of correlation higher than or equal to a predetermined threshold. The reference-pattern generating section 65 then generates a candidate for a reference pattern for each group on the basis of the patterns of occurrence in the group. In this exemplary embodiment, the average of the patterns of occurrence in each group is used as a candidate for a reference pattern for the type of malfunction concerned.

Subsequently, for each candidate for a reference pattern, the reference-pattern generating section 65 refers to the malfunction-information storing section 62 to extract cases where a pattern of occurrence correlated with the candidate for a reference pattern has occurred, and refers to the maintenance-information storing section 64 to determine whether or not maintenance work has occurred for each case, thereby determining the number of cases where maintenance work has occurred and the number of cases where no maintenance work has occurred and calculating the rate of occurrence of maintenance. In this exemplary embodiment, as the cases where a pattern of occurrence correlated with the candidate for a reference pattern has occurred, those where the degree of correlation with the candidate for a reference pattern is higher than or equal to a predetermined threshold are extracted.

Subsequently, a candidate for a reference pattern where the rate of occurrence of maintenance is higher than or equal to a reference value (for example, 60%) is set as a reference pattern and is stored in the reference-pattern storing section 66 in association with the type of malfunction concerned.

After the setting of the reference patterns, on the basis of malfunction information acquired from an image-forming apparatus 10 in which a malfunction has newly occurred and stored in the malfunction-information storing section 62, the similarity-calculating section 67 extracts a recent pattern of occurrence of that type of malfunction and calculates the degree of correlation between the extracted pattern of occurrence and a reference pattern corresponding to that type of malfunction. If multiple reference patterns are set to the type of malfunction concerned (stored in the reference-pattern storing section 66), the similarity-calculating section 67 calculates the degree of correlation with each reference pattern.

The need-for-maintenance determining section 68 determines the need for maintenance of the image-forming apparatus 10 on the basis of the degree of correlation calculated by the similarity-calculating section 67. Specifically, the need-for-maintenance determining section 68 compares the degree of correlation, calculated for each reference pattern, of the recent pattern of occurrence of the malfunction in the target image-forming apparatus 10 with a predetermined threshold and determines that the image-forming apparatus 10 for which the pattern of occurrence of the malfunction has been extracted needs maintenance work if the need-for-maintenance determining section 68 finds a reference pattern having a degree of correlation higher than or equal to the threshold (that is, if a reference pattern similar to the recent pattern of occurrence of malfunction is set). If the type of malfunction is associated with the type of maintenance work, the need-for-maintenance determining section 68 can also determine what type of maintenance work should be carried out.

Figure 7:
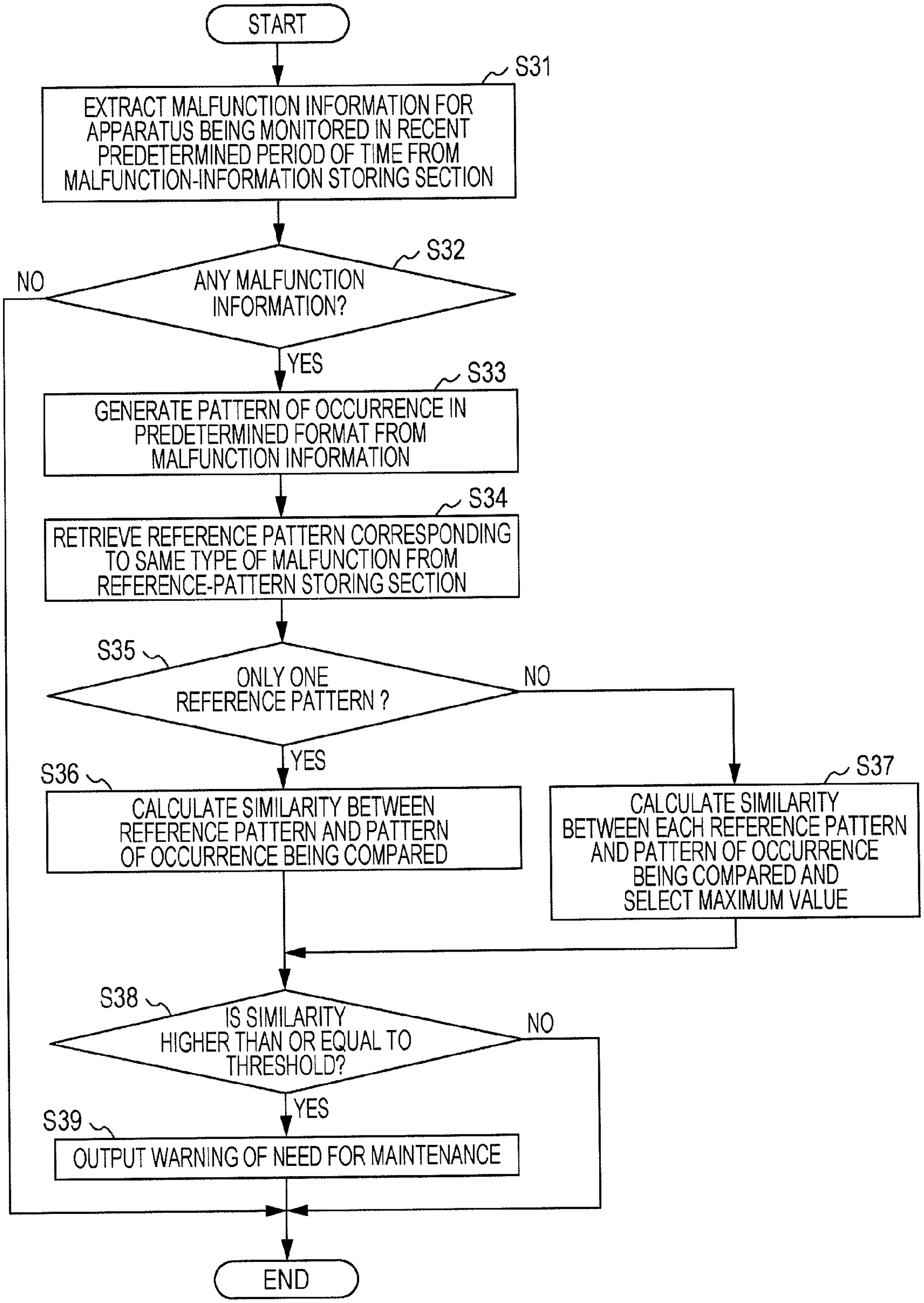
FIG. 7 is a flowchart illustrating an example of a process flow of determining the need for maintenance in the first exemplary embodiment.

An example of the operation of the similarity-calculating section 67 and the need-for-maintenance determining section 68 according to this exemplary embodiment will now be described with reference to the process flow illustrated in FIG. 7.

First, the similarity-calculating section 67 executes a procedure of extracting malfunction information for a target image-forming apparatus 10 in a recent period of time from the malfunction-information storing section 62 (Step S31) and determines whether or not there is malfunction information concerned (Step S32).

If there is no malfunction information concerned, the process ends. If there is malfunction information concerned, on the other hand, the similarity-calculating section 67 extracts a pattern of occurrence of that type of malfunction according to an extraction format (in this exemplary embodiment, a format representing the time series trend of the number of occurrences of the malfunction) (Step S33). In addition, the similarity-calculating section 67 executes a procedure of retrieving a reference pattern corresponding to the type of the malfunction from the reference-pattern storing section 66 (Step S34) and determines whether or not there is only one reference pattern concerned (Step S35).

If there is only one reference pattern concerned, the similarity-calculating section 67 calculates the degree of correlation between that reference pattern and the pattern of occurrence extracted in Step S33 (Step S36). If there are two or more reference patterns concerned, on the other hand, the similarity-calculating section 67 calculates the degree of correlation between each reference pattern and the pattern of occurrence extracted in Step S33 and selects the maximum value (Step S37).

Subsequently, the need-for-maintenance determining section 68 compares the degree of correlation calculated in Step S36 or S37 with a threshold for correlation determination (Step S38). If the degree of correlation is lower than the threshold (there is no correlation), the process ends. If the degree of correlation is higher than or equal to the threshold (there is a correlation), the need-for-maintenance determining section 68 determines that the image-forming apparatus 10 needs maintenance work and transmits information indicating the need for maintenance to the maintenance information input terminal 50 to cause it to output a warning (Step S39).

As described above, according to the first exemplary embodiment, image-forming apparatuses characterizing a malfunction (image-forming apparatuses in which the malfunction has occurred a relatively large number of times and on which maintenance work has been carried out with relatively high probability) are extracted, and the other image-forming apparatuses are excluded from those used for generation of a reference pattern.

As a result, information about malfunctions presumed to be unlikely to be responsible for maintenance work is excluded from the information used for generation of a reference pattern. This allows generation of a reference pattern more accurately expressing a characteristic pattern of occurrence of malfunction preceding maintenance, thus contributing to improved accuracy of determination of the need for maintenance, and also reduces the amount of data processed by the reference-pattern generating section 65, thus reducing the processing load on the overall system.

Figure 8:
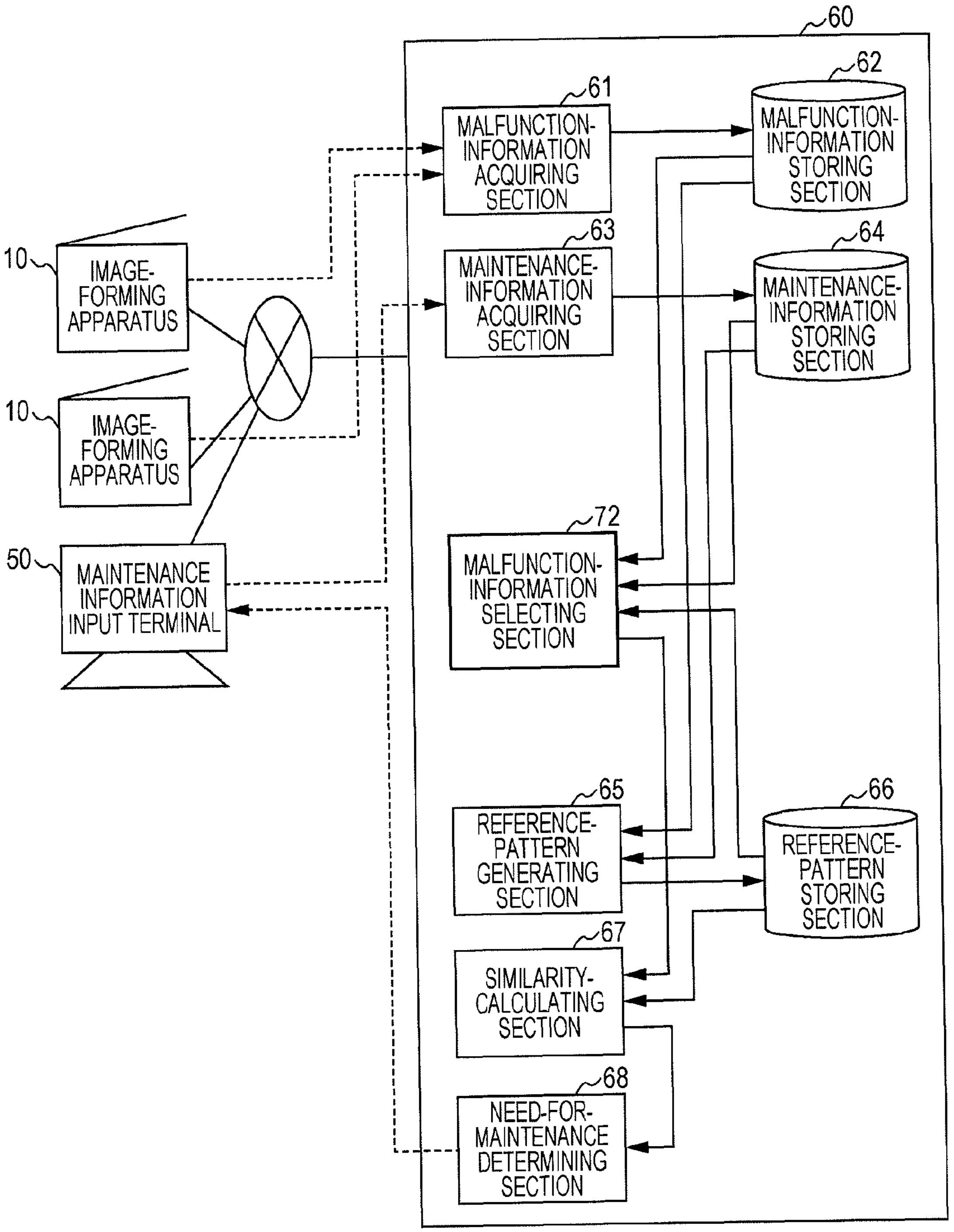
FIG. 8 is a diagram illustrating an image-forming system according to a second exemplary embodiment of the invention.

FIG. 8 illustrates an image-forming system according to a second exemplary embodiment of the invention.

The image-forming system according to this exemplary embodiment includes a malfunction-information selecting section 72 instead of (or in addition to) the reference-information selecting section 71 in the first exemplary embodiment. The following description will focus on parts different from those of the first exemplary embodiment, and a description of the other parts will be omitted.

The reference-pattern storing section 66 associates each reference pattern for each type of malfunction with a reference value (reference number) indicating the minimum number of occurrences of the malfunction for the reference pattern. This reference value is used to exclude malfunction information acquired from image-forming apparatuses 10 with numbers of occurrences of the malfunction at which they have a tendency not to undergo maintenance; the reference value corresponds to the threshold determined by the reference-information selecting section 71 (threshold-determining part 71*b*) in the first exemplary embodiment. For the configuration including the reference-information selecting section 71, the reference-information selecting section 71 associates each reference pattern with the reference value. If there are multiple reference patterns for one type of malfunction, the reference patterns can be associated with different reference values.

Figure 9:
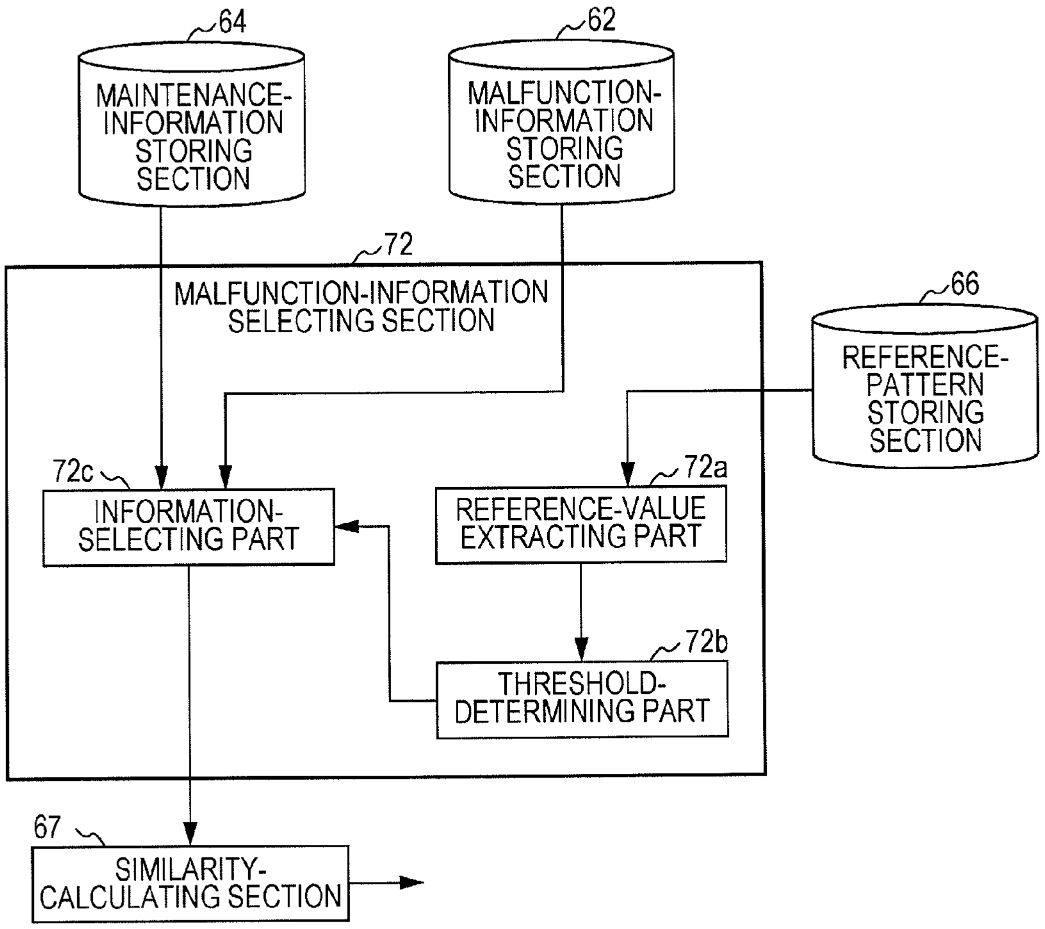
FIG. 9 is a diagram illustrating an example of the functional blocks of a malfunction-information selecting section in a monitoring apparatus according to the second exemplary embodiment.

The malfunction-information selecting section 72 selects (extracts) information used for generation of a pattern of occurrence of malfunction for similarity calculation by the similarity-calculating section 67. As illustrated by the functional blocks in FIG. 9, the malfunction-information selecting section 72 includes a reference-value extracting part 72*a*, a threshold-determining part 72*b*, and an information-selecting part 72*c*.

The reference-value extracting part 72*a* extracts reference values associated with reference patterns for each type of malfunction from the reference-pattern storing section 66.

The threshold-determining part 72*b* determines, as a threshold, the minimum reference value associated with the reference patterns for each type of malfunction.

The information-selecting part 72*c* selects (extracts) information used for generation of a pattern of occurrence of malfunction for similarity calculation on the basis of the threshold determined by the threshold-determining part 72*b* and supplies the pattern of occurrence to the similarity-calculating section 67.

Figure 10:
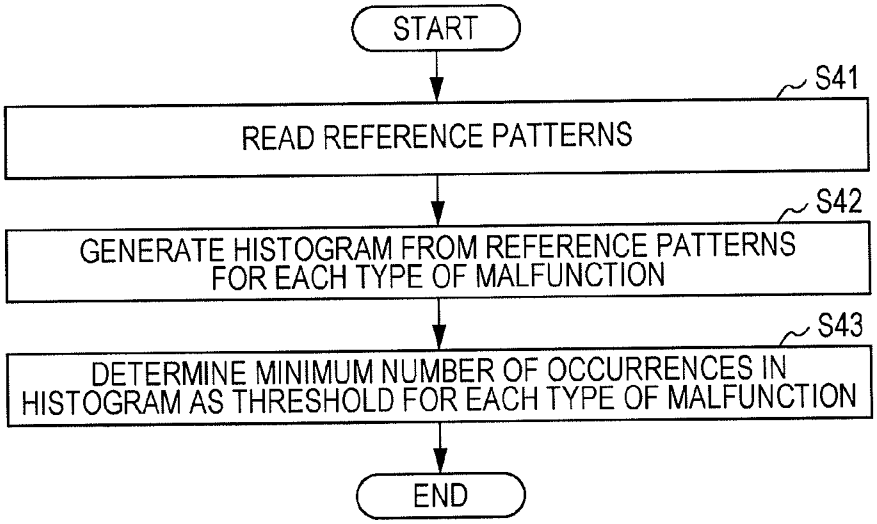
FIG. 10 is a flowchart illustrating an example of a process flow of determining a threshold in the second exemplary embodiment.
Figure 11:
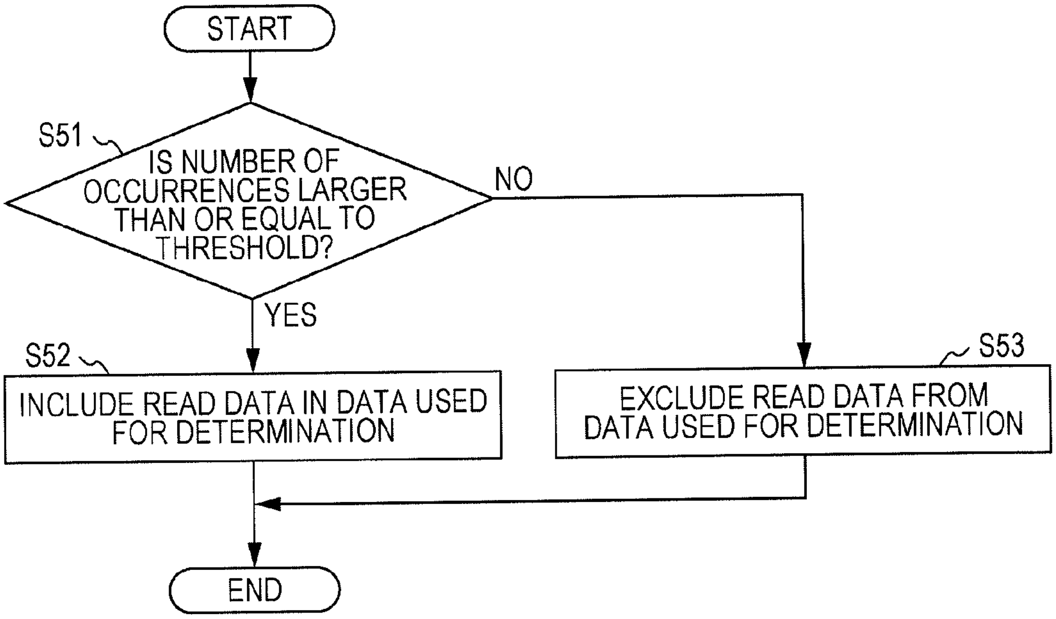
FIG. 11 is a flowchart illustrating an example of a process flow of selecting information in the second exemplary embodiment.

An example of the operation of the malfunction-information selecting section 72 according to this exemplary embodiment will now be described with reference to the process flow illustrated in FIGS. 10 and 11.

In the malfunction-information selecting section 72, first, the reference-value extracting part 72*a* extracts reference patterns from the reference-pattern storing section 66 (Step S41).

Next, the threshold-determining part 72*b* generates a histogram of the reference values associated with the reference patterns for each type of malfunction (Step S42) and determines the minimum reference value in the histogram as a threshold (Step S43).

Subsequently, on the basis of malfunction information acquired from an image-forming apparatus 10 in which a malfunction has newly occurred after the setting of the reference patterns, the information-selecting part 72*c* determines a recent number of occurrences of the malfunction and compares the number of occurrences with the determined threshold (Step S51), selects malfunction information and maintenance information corresponding to a case where the number of occurrences of the malfunction is higher than or equal to the threshold as information used for generation of a pattern of occurrence of malfunction for calculation of the degree of correlation, and supplies the information to the similarity-calculating section 67 (Step S52). On the other hand, malfunction information and maintenance information corresponding to a case where the number of occurrences of the malfunction is smaller than the threshold are excluded from the information used for generation of a pattern of occurrence of malfunction for calculation of the degree of correlation (Step S53).

As described above, according to the second exemplary embodiment, the criterion (the minimum number of occurrences of the malfunction) used for extraction of cases used for generation of a reference pattern is determined, only cases where the malfunction has occurred at least a number of times satisfying the criterion are extracted for generation of a pattern of occurrence of malfunction for calculation of the degree of correlation, and the other cases are excluded from those used for generation of a pattern of occurrence of malfunction for calculation of the degree of correlation.

As a result, information about cases where the malfunction has occurred a number of times insufficient for comparison with a reference pattern is excluded from the information used for generation of a pattern of occurrence of malfunction for calculation of the degree of correlation. This reduces the amount of data processed by the similarity-calculating section 67, thus reducing the processing load on the overall system.

Figure 12:
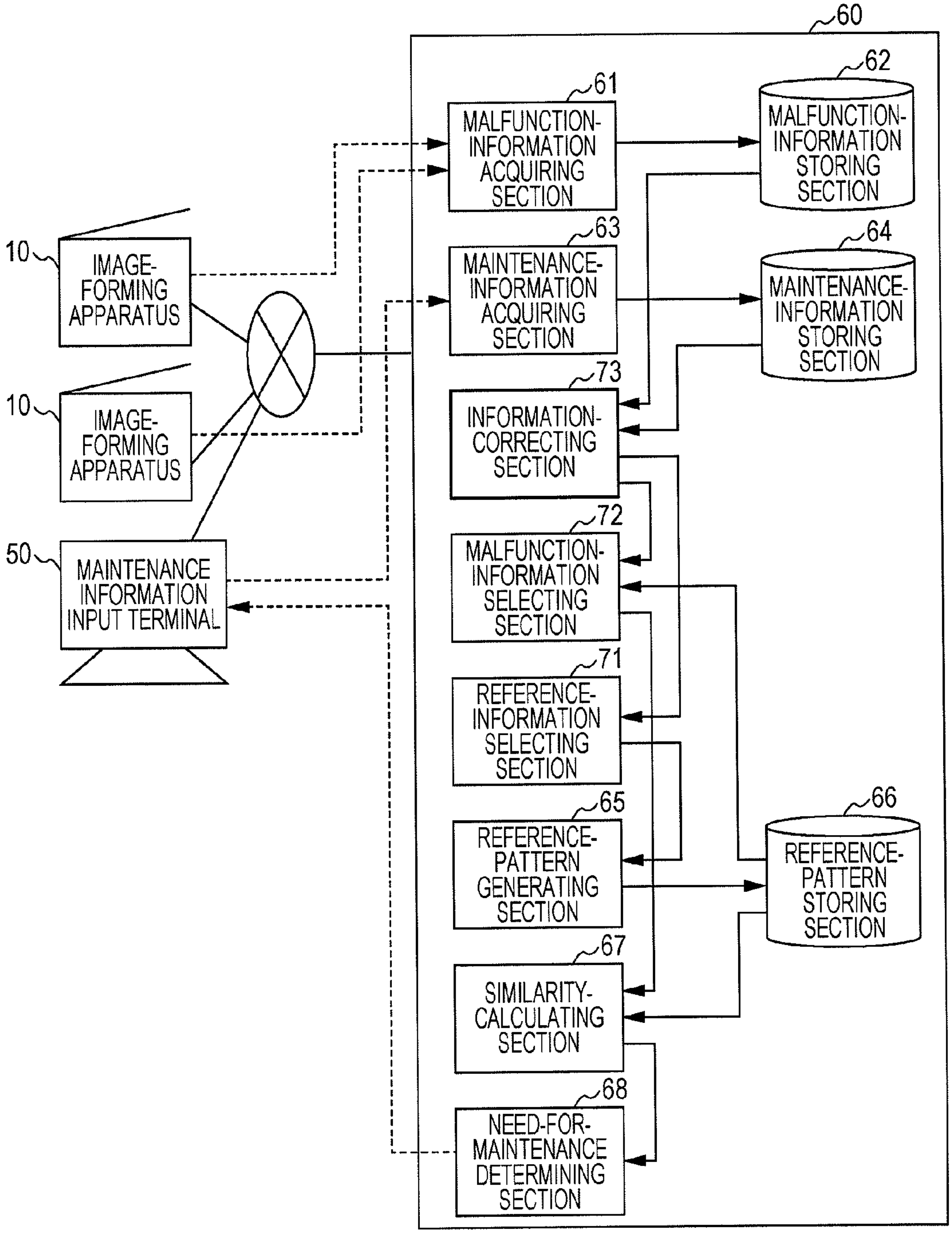
FIG. 12 is a diagram illustrating an image-forming system according to a third exemplary embodiment of the invention.

FIG. 12 illustrates an image-forming system according to a third exemplary embodiment of the invention.

The image-forming system according to this exemplary embodiment includes an information-correcting section 73 in addition to the reference-information selecting section 71 in the first exemplary embodiment and the malfunction-information selecting section 72 in the second exemplary embodiment. The following description will focus on parts different from those of the first and second exemplary embodiments, and a description of the other parts will be omitted.

The information-correcting section 73 corrects the information used for processing by the reference-information selecting section 71 and the malfunction-information selecting section 72. As illustrated by the functional blocks in FIGS. 13 and 15, the information-correcting section 73 includes a date-of-origin determining part 73*a* and a data-correcting part 73*b*.

Figure 13:
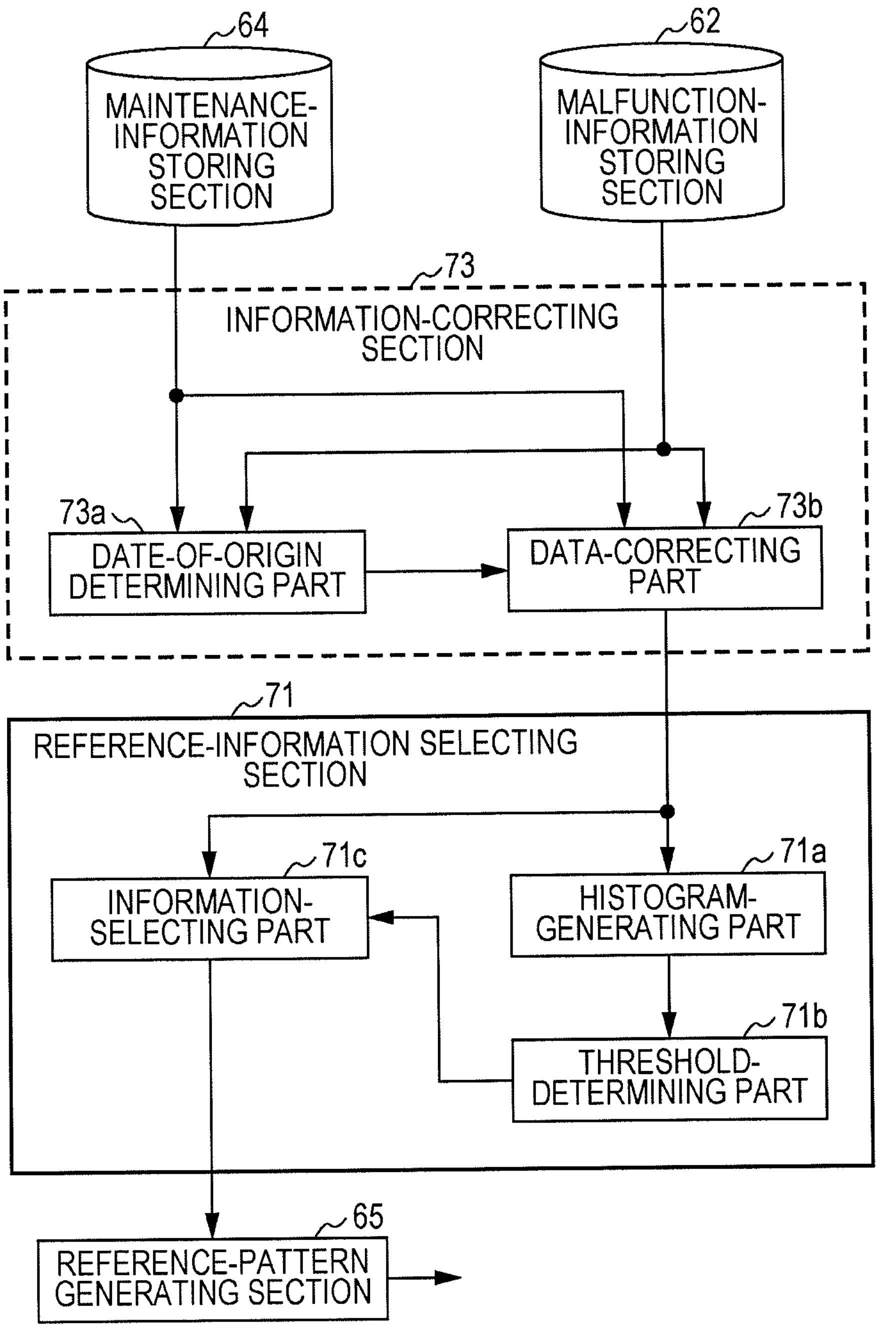
FIG. 13 is a diagram illustrating an example of the functional blocks of an information-correcting section and a reference-information selecting section in a monitoring apparatus according to the third exemplary embodiment.

A process of correcting the information used for processing by the reference-information selecting section 71 will now be described with reference to FIGS. 13 and 14.

Figure 14A:
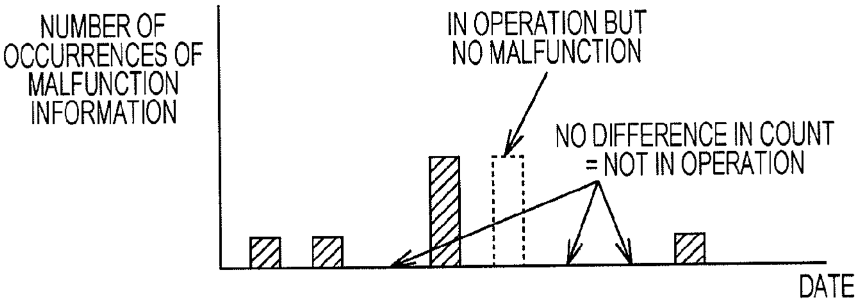
FIGS. 14A to 14C are graphs illustrating data correction in the third exemplary embodiment.
Figure 14B:
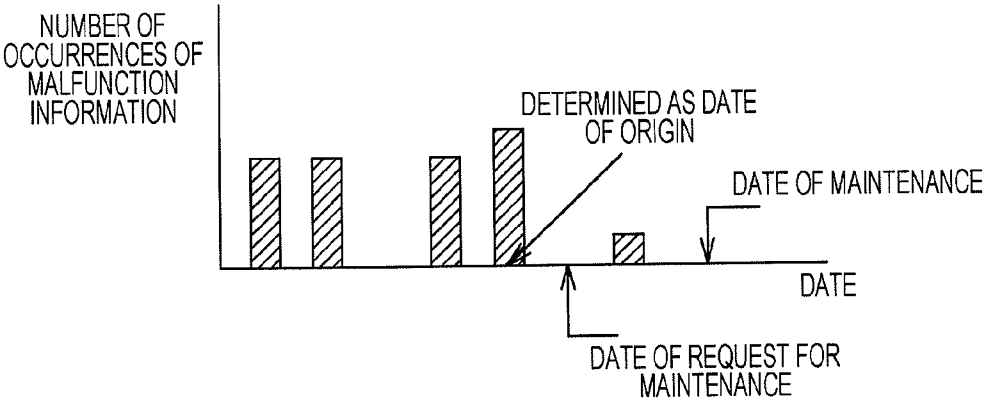

The date-of-origin determining part 73*a* determines the date of origin used as the origin for generation of a pattern of occurrence of malfunction detected in an image-forming apparatus 10 on which maintenance work has been carried out in the past in a period of time before the maintenance work. In this case, as illustrated in FIG. 14B, the date of origin refers to a recent date with an occurrence of the same type of malfunction as the cause of the request for maintenance (the malfunction to be removed by the maintenance) in the period of time extending back from the date of request for maintenance (that is, the probable date with an occurrence of a fault affecting the use of the image-forming apparatus 10). In this exemplary embodiment, the maintenance information transmitted from the maintenance information input terminal 50 contains the date and time of request for maintenance, which is used to determine the date of origin.

For the type of malfunction detected in the image-forming apparatus 10, the data-correcting part 73*b* extracts malfunction information for a predetermined number of days (for example, five days) extending back from the date of origin determined by the date-of-origin determining part 73*a* and supplies the information to the reference-information selecting section 71. During this process, as illustrated in FIG. 14A, if there are days with no occurrence of the type of malfunction concerned and no operation of the image-forming apparatus 10 (for example, no difference in the count of the number of images formed), the days themselves are ignored in processing for the image-forming apparatus 10. In addition, the data-correcting part 73*b* extracts earlier malfunction information in the amount equivalent to the number of days ignored because the amount of data equivalent to the number of days ignored would otherwise be missing.

Figure 14C:
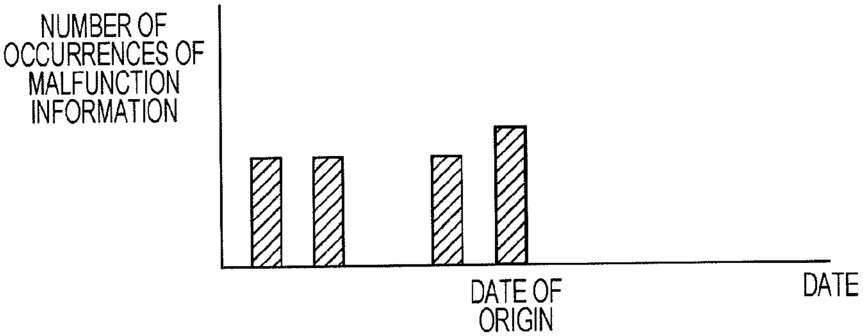

FIG. 14C illustrates an example of the daily number of occurrences of malfunction information extracted as the result of the above process.

Figure 15:
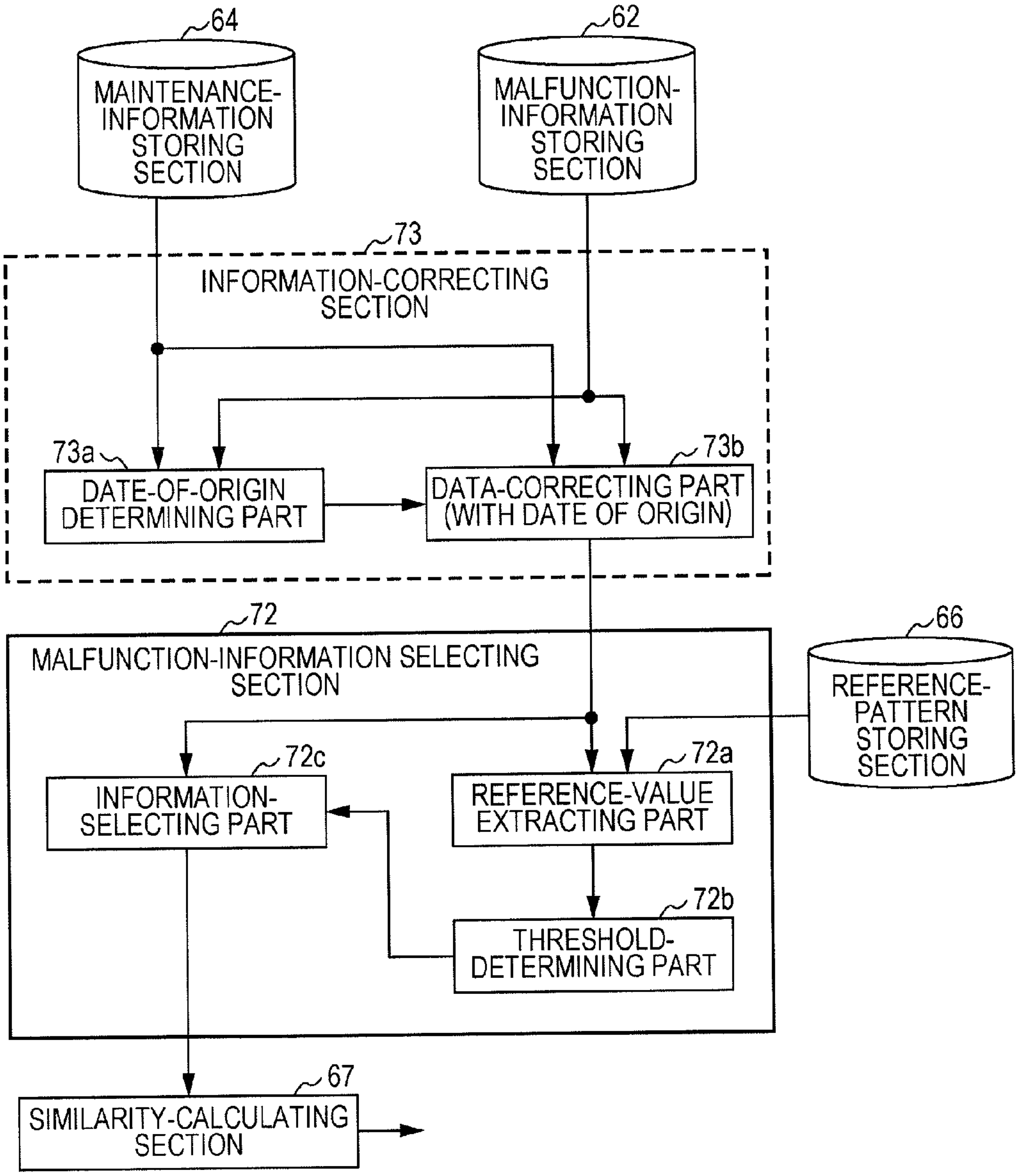
FIG. 15 is a diagram illustrating an example of the functional blocks of the information-correcting section and a malfunction-information selecting section in a monitoring apparatus according to the third exemplary embodiment.

A process of correcting the information used for processing by the malfunction-information selecting section 72 will now be described with reference to FIG. 15.

The date-of-origin determining part 73*a* determines the current date as the date of origin.

For the type of a malfunction that has newly occurred in any image-forming apparatus 10 after the setting of the reference patterns, the data-correcting part 73*b* extracts malfunction information for a predetermined number of days (for example, five days) extending back from the date of origin determined by the date-of-origin determining part 73*a* and supplies the information to the reference-information selecting section 71. If there are days with no occurrence of the type of malfunction concerned and no operation of the image-forming apparatus 10, the days themselves are ignored in processing for the image-forming apparatus 10. In addition, the data-correcting part 73*b* extracts earlier malfunction information in the amount equivalent to the number of days ignored because the amount of data equivalent to the number of days ignored would otherwise be missing.

Although the process described in this exemplary embodiment uses days as the unit of granularity, it may use another time length as the unit of granularity.

In addition, although the image-forming apparatuses 10 are determined not to be in operation if the number of images formed is zero in this exemplary embodiment, it is also possible to determine whether the image-forming apparatuses 10 are in operation or not on the basis of another type of information obtained from the image-forming apparatuses 10, such as mode information transmitted from the image-forming apparatuses 10, from which they can be determined to be in a suspend mode, or interruption of regular transmission of information from the image-forming apparatuses 10 in operation.

Figure 16:
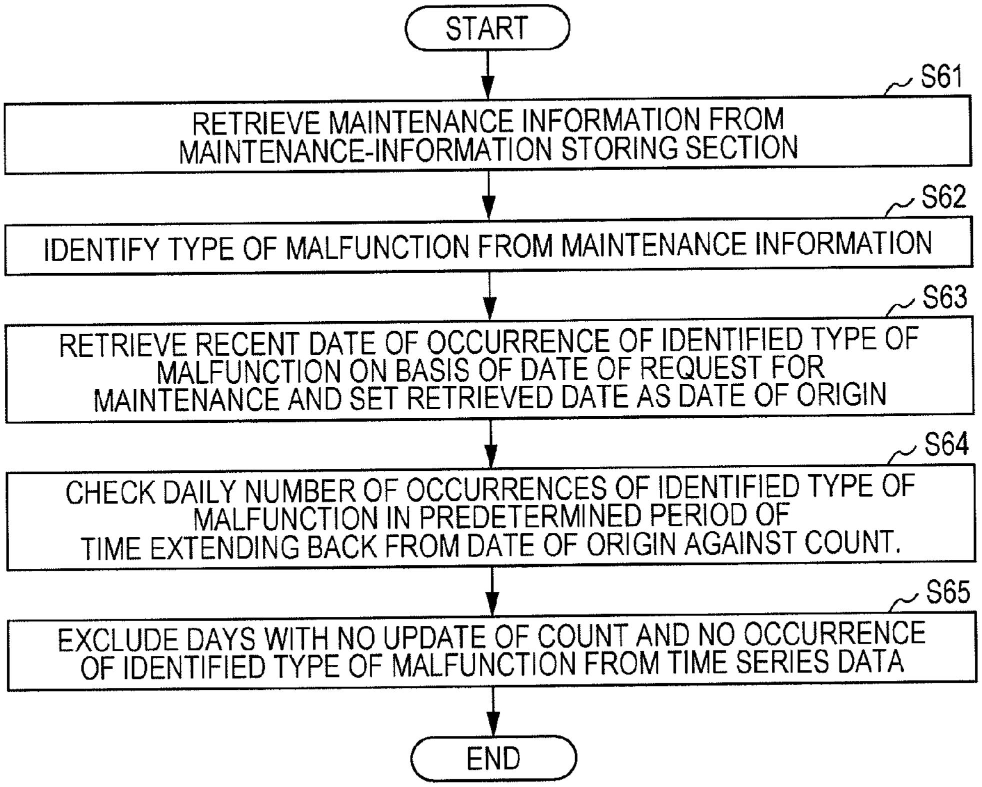
FIG. 16 is a flowchart illustrating an example of a process flow of correcting data in the third exemplary embodiment.

FIG. 16 illustrates an example of the process flow of a process of correcting the information used for processing by the reference-information selecting section 71.

In the information-correcting section 73, first, the date-of-origin determining part 73*a* retrieves maintenance information from the maintenance-information storing section 64 (Step S61) and identifies the type of malfunction associated with the maintenance work (Step S62). For the identified type of malfunction, the date-of-origin determining part 73*a* retrieves a recent date of occurrence of the malfunction in the image-forming apparatus 10 corresponding to the maintenance information and sets the date as the date of origin (Step S63).

Next, for the type of malfunction detected in the image-forming apparatus 10, the data-correcting part 73*b* checks the daily number of occurrences of the malfunction in a predetermined number of days (for example, five days) extending back from the date of origin determined by the date-of-origin determining part 73*a* against the count (Step S64). This count is information used to determine whether or not the image-forming apparatus 10 is in operation. Although the count of the number of images formed is used in this exemplary embodiment, other information, such as the count of the driving distance of the sheet feed roller, may be used instead. Thus, the data-correcting part 73*b* excludes days with no update of the count (that is, no operation of the image-forming apparatus 10) and no occurrence of the identified type of malfunction from the time series data (the daily number of occurrences of the malfunction) (Step S65). To add the amount of data equivalent to the number of days excluded, the above processing (Steps S64 and S65) is further executed for that number of days earlier.

FIGS. 17A to 17D illustrate an example of a result of data correction by the information-correcting section 73.

Figures 17A, 17B, 17C, 17D:
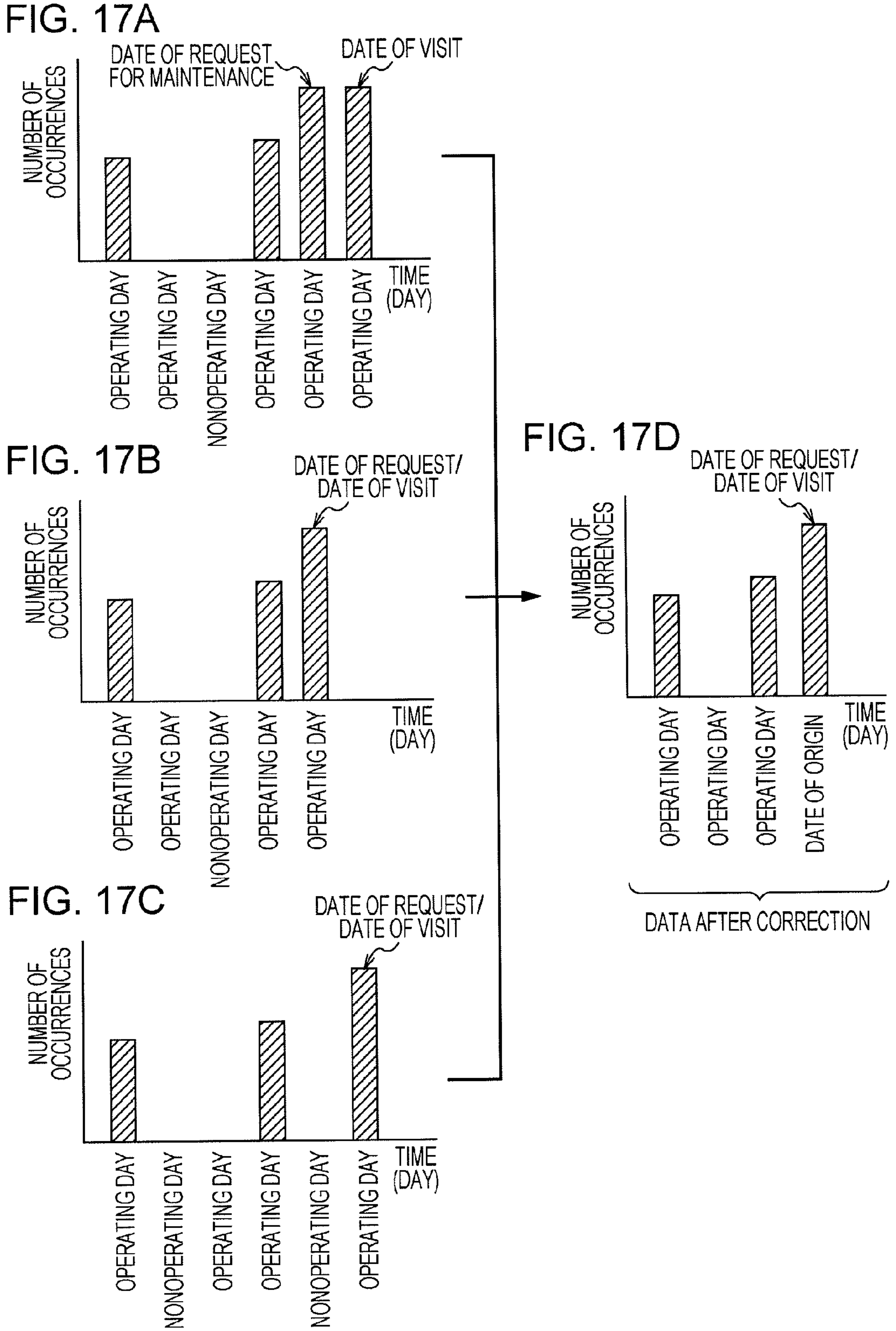
FIGS. 17A to 17D are graphs illustrating an example of a result of data correction in the third exemplary embodiment.

FIGS. 17A to 17C illustrate three examples of pattern of the daily number of occurrences of the malfunction before data correction, and FIG. 17D illustrates an example of the result of data correction for the three patterns.

The graphs in FIGS. 17A and 17B are identical in the distribution of operating days and nonoperating days and the number of occurrences of malfunction on operating days, but are different in the relationship between the date of request for maintenance and the date of visit (date of maintenance). The graphs in FIGS. 17B and 17C, on the other hand, are identical in the relationship between the date of request for maintenance and the date of visit and the number of occurrences of malfunction on operating days, but are different in the distribution of operating days and nonoperating days.

Thus, the three patterns are different before data correction; with data correction, as shown in FIG. 17D, they converge into one pattern.

As described above, the third exemplary embodiment avoids generation of multiple reference patterns that should originally converge into one pattern as a result of data variations due to, for example, the operational status of the image-forming apparatuses 10 and the difference between the date of request for maintenance of the image-forming apparatuses 10 and the date of maintenance, thus reducing the number of reference patterns.

This reduces the amount of data processed by the similarity-calculating section 67, thus reducing the processing load on the overall system, and also improves the accuracy of determination of the need for maintenance.

The monitoring apparatus 60 shown in the first to third exemplary embodiments integrally includes a criterion-setting apparatus that sets a criterion for maintenance and a determination apparatus that determines the need for maintenance of the image-forming apparatuses 10 on the basis of the set criterion for maintenance, although they may be distributed among separate apparatuses.

In the above exemplary embodiments, additionally, the target image-forming apparatuses 10 may be the same or different from the image-forming apparatuses 10 used for setting a reference pattern. That is, a reference pattern may be set on the basis of past malfunction information and maintenance information acquired from one or more image-forming apparatuses 10 (which may include the target image-forming apparatuses 10) and be used to determine the need for maintenance of the target image-forming apparatuses 10.

Figure 18:
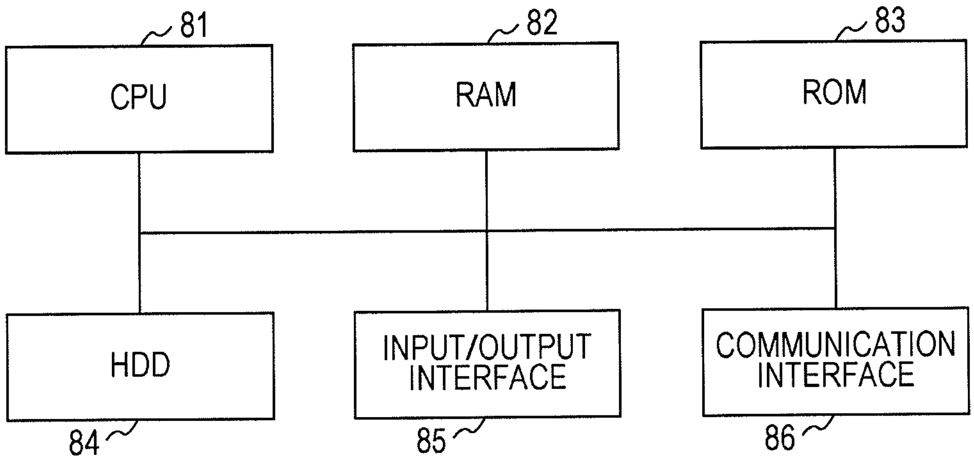
FIG. 18 is a diagram illustrating an example of the hardware configuration of a computer that operates as a monitoring apparatus in an image-forming system according to an exemplary embodiment of the invention.

FIG. 18 illustrates an example of the hardware configuration of a computer that operates as the monitoring apparatus 60 in the prediction systems according to the above exemplary embodiments.

In the above exemplary embodiments, the monitoring apparatus 60 is configured by a computer having hardware resources including a central processing unit (CPU) 81 that executes various operations, main memories such as a random access memory (RAM) 82 that provides a workspace for the CPU 81 and a read-only memory (ROM) 83 on which basic control programs are recorded, an auxiliary memory such as a hard disk drive (HDD) 84 that stores a program according to an exemplary embodiment of the invention and various kinds of data, a display that displays various kinds of information, an input/output interface 85 to an input device, such as operation buttons or a tough panel, used by the user for input operation, and a communication interface 86 for wired or wireless communication with another device.

The program according to the exemplary embodiment of the invention is read from the HDD 84, is loaded into the RAM 82, and is executed by the CPU 81 to implement various functions of a criterion-setting apparatus according to an exemplary embodiment of the invention on the computer.

To install the program according to the exemplary embodiment of the invention into the computer, for example, it may be read from an external storage medium such as a CD-ROM or may be received via a communication network.

In addition, the individual functions do not necessarily have to be implemented by software configuration, as in the above exemplary embodiments, but may instead be implemented by dedicated hardware modules.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image-forming system comprising:

a first determining section that, for each type of malfunction in a group of image-forming apparatuses, determines a reference number of occurrences of the type of malfunction based on at least one of (1) a distribution of the number of image-forming apparatuses in which the type of malfunction has occurred against the number of occurrences of the type of malfunction and (2) a distribution of the number of image-forming apparatuses on which maintenance has been carried out after the occurrence of the type of malfunction against the number of occurrences of the type of malfunction;

an extracting section that, for the type of malfunction for which the reference number of occurrences has been determined by the first determining section, identifies and extracts from the group of image-forming apparatuses a subgroup of image-forming apparatuses in which the malfunction has occurred a number of times larger than or equal to the reference number of occurrences;

a setting section that generates a time series tendency of occurrence of the malfunction in an image-forming apparatus on which maintenance has been carried out in the subgroup extracted by the extracting section and that sets the tendency of occurrence of the malfunction as a criterion for maintenance for the type of malfunction if the tendency of occurrence of the malfunction satisfies a predetermined setting condition; and a second determining section that, for the type of malfunction for which the tendency of occurrence has been set by the setting section, compares a recent time series tendency of occurrence of the malfunction in a target image-forming apparatus with the tendency of occurrence of the malfunction set by the setting section to determine need for maintenance of the target image-forming apparatus on the basis of a degree of correlation between the tendencies of occurrence.

2. The image-forming system according to claim 1, wherein the second determining section determines need for maintenance of an image-forming apparatus in which the malfunction has recently occurred a number of times larger than or equal to the number of occurrences determined by the first determining section.

3. The image-forming system according to claim 1, wherein the setting section generates the time series tendency of occurrence of the malfunction in the image-forming apparatus on which maintenance has been carried out on the basis of occurrences of the malfunction in the image-forming apparatus in a period of time extending back from a date and time of request for maintenance of the image-forming apparatus.

4. The image-forming system according to claim 2, wherein the setting section generates the time series tendency of occurrence of the malfunction in the image-forming apparatus on which maintenance has been carried out on the basis of occurrences of the malfunction in the image-forming apparatus in a period of time extending back from a date and time of request for maintenance of the image-forming apparatus.

5. The image-forming system according to claim 1, wherein the setting section and the second determining section divide occurrences of the malfunction in each of the image-forming apparatuses into periods of predetermined time length and ignores a period with no occurrence of the malfunction and no operation of the image-forming apparatus.

6. A criterion-setting apparatus comprising:

a determining section that, for each type of malfunction in a group of image-forming apparatuses, determines a reference number of occurrences of the type of malfunction based on at least one of (1) a distribution of the number of image-forming apparatuses in which the type of malfunction has occurred against the number of occurrences of the type of malfunction and (2) a distribution of the number of image-forming apparatuses on which maintenance has been carried out after the occurrence of the type of malfunction against the number of occurrences of the type of malfunction;

an extracting section that, for the type of malfunction for which the reference number of occurrences has been determined by the determining section, identifies and extracts from the group of image-forming apparatuses a subgroup of image-forming apparatuses in which the malfunction has occurred a number of times larger than or equal to the reference number of occurrences; and a setting section that generates a time series tendency of occurrence of the malfunction in an image-forming apparatus on which maintenance has been carried out in the subgroup extracted by the extracting section and that sets the tendency of occurrence of the malfunction as a criterion for maintenance for the type of malfunction if the tendency of occurrence of the malfunction satisfies a predetermined setting condition.

7. A non-transitory computer readable medium storing a program causing a computer to execute a process comprising:

for each type of malfunction in a group of image-forming apparatuses, determining a reference number of occurrences of the type of malfunction based on at least one of (1) a distribution of the number of image-forming apparatuses in which the type of malfunction has occurred against the number of occurrences of the type of malfunction and (2) a distribution of the number of image-forming apparatuses on which maintenance has been carried out after the occurrence of the type of malfunction against the number of occurrences of the type of malfunction;

for the type of malfunction for which the reference number of occurrences has been determined by the determining, identifying and extracting from the group of image-forming apparatuses a subgroup of image-forming apparatuses in which the malfunction has occurred a number of times larger than or equal to the reference number of occurrences; and generating a time series tendency of occurrence of the malfunction in an image-forming apparatus on which maintenance has been carried out in the subgroup extracted by the extracting and setting the tendency of occurrence of the malfunction as a criterion for maintenance for the type of malfunction if the tendency of occurrence of the malfunction satisfies a predetermined setting condition.

* * * * *